(12) United States Patent
Kujtkowski et al.

(10) Patent No.: US 9,703,722 B2
(45) Date of Patent: Jul. 11, 2017

(54) METHOD AND SYSTEM FOR COMPRESSING DATA FOR A TRANSLATION LOOK ASIDE BUFFER (TLB)

(71) Applicant: Cavium, Inc., San Jose, CA (US)

(72) Inventors: Anna Kujtkowski, Rochdale, MA (US); Wilson P. Snyder, II, Holliston, MA (US)

(73) Assignee: CAVIUM, INC., San Jose, CA (US)

( * ) Notice: Subject to any disclaimer, the term of this patent is extended or adjusted under 35 U.S.C. 154(b) by 87 days.

(21) Appl. No.: 14/940,679

(22) Filed: Nov. 13, 2015

(65) Prior Publication Data

US 2016/0140050 A1    May 19, 2016

Related U.S. Application Data

(60) Provisional application No. 62/079,706, filed on Nov. 14, 2014.

(51) Int. Cl.
| | | |
|---|---|---|
| G06F 12/10 | (2016.01) | |
| G06F 12/1027 | (2016.01) | |
| H04L 12/743 | (2013.01) | |
| G06F 12/1009 | (2016.01) | |

(52) U.S. Cl.
CPC ...... G06F 12/1027 (2013.01); G06F 12/1009 (2013.01); H04L 45/7457 (2013.01); G06F 2212/1016 (2013.01); G06F 2212/401 (2013.01); G06F 2212/68 (2013.01)

(58) Field of Classification Search
None
See application file for complete search history.

(56) References Cited

U.S. PATENT DOCUMENTS

2011/0087840 A1* 4/2011 Glasco ............... G06F 12/08
                                                            711/118

* cited by examiner

*Primary Examiner* — John A Lane
(74) *Attorney, Agent, or Firm* — Brown Rudnick LLP; Nikhil Patel

(57) ABSTRACT

An embodiment of the present disclosure includes a method for compressing data for a translation look aside buffer (TLB). The method includes: receiving an identifier at a content addressable memory (CAM), the identifier having a first bit length; compressing the identifier based on a location within the CAM the identifier is stored, the compressed identifier having a second bit length, the second bit length being smaller than the first bit length; and mapping at least the compressed identifier to a physical address in a buffer.

10 Claims, 7 Drawing Sheets

METHOD AND SYSTEM FOR COMPRESSING DATA FOR A TRANSLATION LOOK ASIDE BUFFER (TLB)

RELATED APPLICATIONS

This application claims the benefit of priority of U.S. Provisional Application No. 62/079,706 filed Nov. 14, 2014, the disclosure of which is incorporated herein by reference in its entirety.

BACKGROUND

A system memory management unit (SMMU) (sometimes called a memory management unit) is a hardware unit on a chip that translates virtual addresses from a user process running on a device to a physical memory address. The SMMU employs various logic and memory resources to convert the virtual address to the physical address. The memory resources, for example, can include content-addressable memories (CAMs), lookup tables (LUTs) and cache memories. Employing multiple SMMUs on the chip can increase the chip's speed in translating many virtual addresses to physical addresses.

SUMMARY

Embodiments of the present disclosure include methods and systems for compressing data for a translation look aside buffer (TLB).

One embodiment is a method. The method includes receiving an identifier at a content addressable memory (CAM), the identifier having a first bit length. The method also includes compressing the identifier based on a location within the CAM the identifier is stored, the compressed identifier having a second bit length, the second bit length being smaller than the first bit length. In addition, the method includes mapping at least the compressed identifier to a physical address in a buffer.

The identifier can be at least one of: a Virtual Machine Identifier (VMID) and Address Space Identifier (ASID), the VMID and ASID being parsed from a context associated with a virtual address.

The context can be a logical data structure used by the TLB to identify a page table entry, the page table entry mapping a virtual address associated with the identifier to the physical address.

The method can also include adjusting an allocation count in an allocation count register, the allocation count register being communicatively coupled to the CAM.

Further, the method can include identifying a replacement identifier in the CAM; decreasing a first allocation count in the allocation count register corresponding to the replacement identifier in the CAM; if the identifier is represented in the CAM, increasing a second allocation count in the allocation count register corresponding to the identifier stored in the CAM; and if the identifier is not represented in the CAM, storing the identifier in a free location in the CAM and increasing a second allocation count in the allocation count register corresponding to the identifier stored in free location in the CAM.

Another embodiment is a system. The system includes a content addressable memory (CAM) configured to receive an identifier. The CAM is further configured to compress the identifier based on a location within the CAM the identifier is stored, the compressed identifier having a second bit length, the second bit length being smaller than the first bit length. The system also includes a TLB configured to map at least the compressed identifier to a physical address. In particular, the TLB is configured to map a virtual address to a physical address using the compressed identifier as part of a mapping system.

The system can include an allocation count register configured to store an allocation count, the allocation count register being communicatively coupled to the CAM.

The system can further include a memory management unit configured to: identify a replacement identifier in the CAM; decrease a first allocation count in the allocation count register corresponding to the replacement identifier in the CAM; if the identifier is represented in the CAM, increase a second allocation count in the allocation count register corresponding to the identifier stored in the CAM; and if the identifier is not represented in the CAM, store the identifier in a free location in the CAM and increasing a second allocation count in the allocation count register corresponding to the identifier stored in free location in the CAM.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
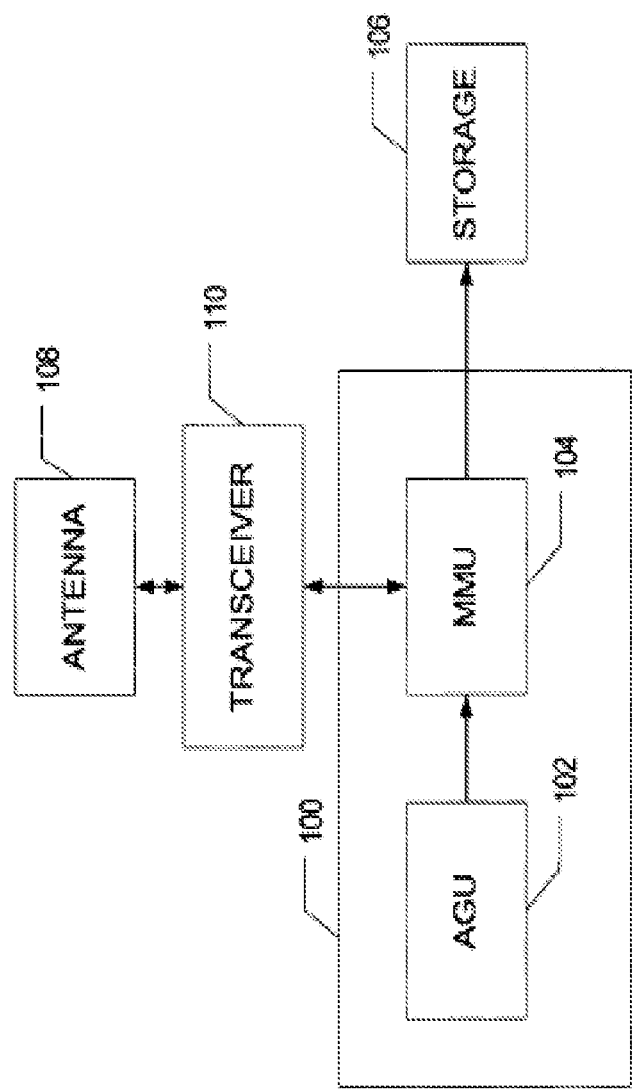
FIG. 1 illustrates various logic blocks of a computing system according to an embodiment of the present disclosure.

A description of example embodiments of the present disclosure follows.

Modern computing systems often use virtual memory schemes in order to maximize the use of physical storage space in processors. Virtual memory is well known in the art. Virtual memory can be addressed by virtual addresses. The virtual address space related to a program is conventionally divided into pages. Pages are blocks of contiguous virtual memory addresses. While programs may be written with reference to virtual addresses, a translation to physical address may be necessary for the execution of program instructions by processors. Page tables may be employed to map virtual addresses to corresponding physical addresses.

Memory management units (MMUs) are commonly used to handle translation of virtual addresses to physical addresses. MMUs look up page table entries (PTEs) which include the virtual-to-physical address mappings, in order to handle the translation. Physical memory space may be managed by dynamically allocating and freeing blocks of the physical memory or data buffers. In this process of dynamic allocation and freeing, it is common for the free physical memory space to become fragmented, comprising non-contiguous free blocks. Thus, a contiguous range of virtual addresses may become mapped to several non-contiguous blocks of physical memory. Accordingly, the page table look up process, also known as "page table walker" may need to be performed frequently, as contiguous virtual addresses may not conveniently map to contiguous physical addresses. These frequent page table lookups may significantly impact performance.

One conventional technique to address frequent page table lookups includes the use of a translation cache, also known as a translation lookaside buffer (TLB). A TLB may cache translations for frequently accessed pages in a tagged hardware lookup table. Thus, if a virtual address hits in a TLB, the corresponding physical address translation may be reused from the TLB, without having to incur the costs associated with a page table walk.

A Virtual Machine Identifier (VMID) and Address Space Identifier (ASID) are identifiers used by a mapping system of a MMU for determining a physical address from a corresponding virtual address. A data structure including the VMID and ASID is input to a page table walker to perform a page table walk (i.e., page table search). A width of each stage of a page table walker's pipeline required to process input data is directly proportional to a bit size of the data input into the page table walker. Thus, the greater the bit size of the input data the greater the width of each stage of a page table walker's pipeline. In addition, a memory size width of a TLB must support all bits of the input data. In addition, the memory size width of the TLB must support all mask bits associated with each bit of the input data. The width of the TLB, however, affects the number of cycles required to search the TLB for a matching entry. Thus, a reduced memory width size of a TLB increases a search speed for a matching entry in the TLB.

Embodiments of the present disclosure decrease the size of a TLB on an MMU by introducing a content addressable memory (CAM) configured to compresses context data associated with a virtual address. The CAM compresses the context data based on a location of the CAM the context data is stored. The compressed context data is then stored in the TLB to map the virtual address to a physical address. Because the TLB stores compressed context data, the physical size of the TLB on the MMU can be decreased. Advantageously, the reduced size of the TLB frees up physical space on a processing chip. The freed up space can be used for additional processing elements for a computing system.

It should be noted that the context data can be an identifier that is at least one of: a Virtual Machine Identifier (VMID) and Address Space Identifier (ASID). The VMID and ASID are parsed from the context data associated with the virtual address.

FIG. 1 illustrates various logic blocks of a computing system according to an embodiment of the present disclosure. A processor 100 includes an address generation unit (AGU) 102 and a memory management unit (MMU) or system memory management unit (SMMU) 104. AGU 102 may be, for example, an arithmetic logic unit (ALU) that generates data addresses or, for example, an incrementor that generates instruction addresses. The addresses generated by AGU 102 are virtual addresses. MMU 104 converts the virtual addresses into physical addresses. Those physical addresses are used to access, for example, to read or write a storage 106. Storage 106 may be internal or external to processor 100.

Processor 100 represents a central processing unit (CPU) of any type of architecture, including an ARM, a CISC or a RISC type architecture. Storage 106 represents one or more mechanisms for storing data. For example, storage 106 may include read only memory (ROM), random access memory (RAM), magnetic disk storage mediums, optical storage mediums, and/or flash memory devices. While embodiments of the present disclosure are described in an environment using a single processor computing system, embodiments of the present disclosure can be implemented in a multi-processor computing system.

Processor 100 can be in any of a number of computing and communication systems including, but not limited to, mainframes, minicomputers, servers, workstations, personal computers, notepads, personal digital assistants, various wireless communication devices that may include one or more antenna(e) 108 and transceiver 110 and embedded systems, just to name a few.

Figure 2:
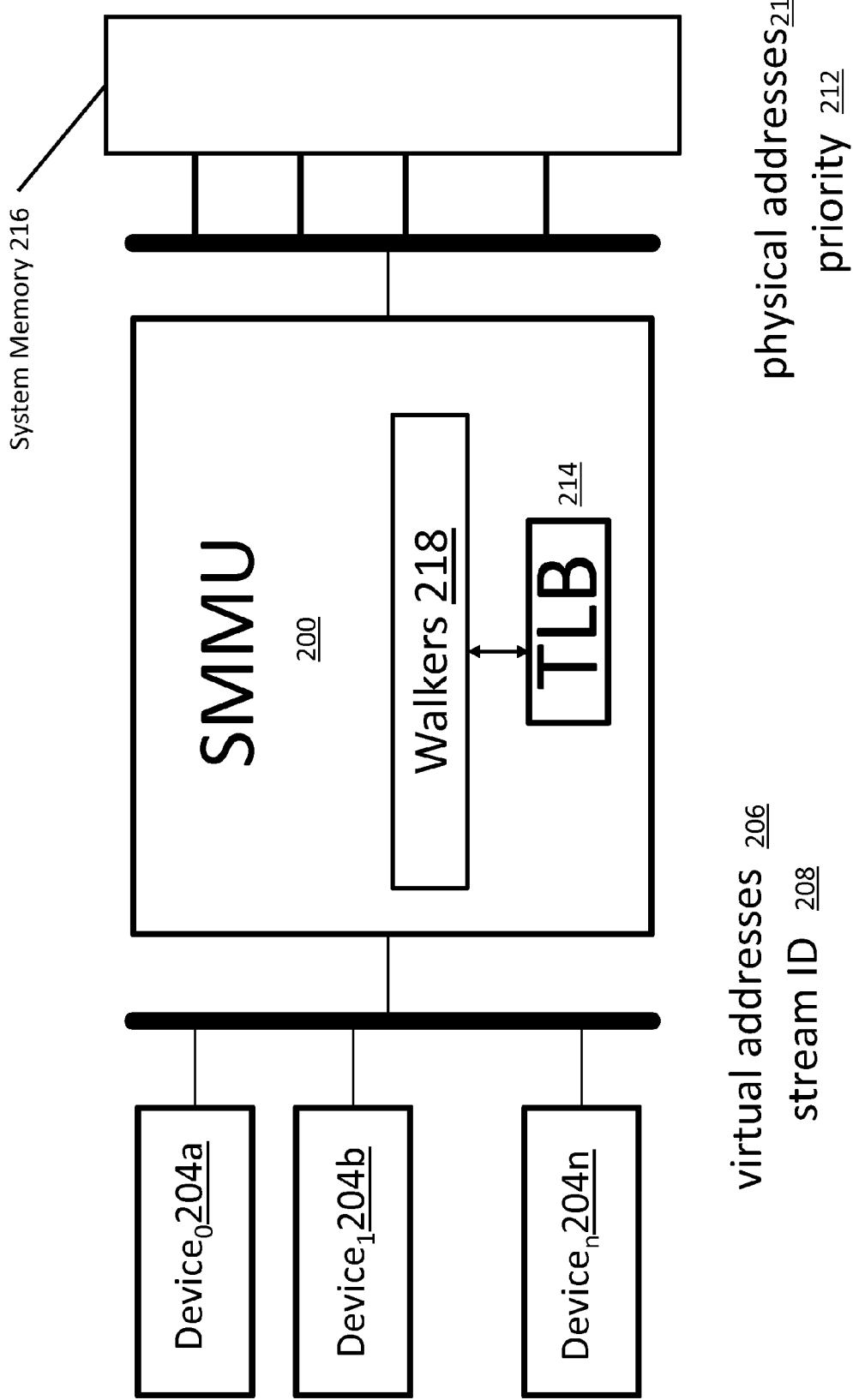
FIG. 2 is a block diagram of a system memory management unit (SMMU) according to an example embodiment of the present disclosure.

FIG. 2 is a block diagram of a System Memory Management Unit (SMMU) 200 in accordance with an example embodiment of the present disclosure. The System Memory Management Unit (SMMU) 200 receives corresponding virtual addresses 206 and stream IDs 208 from a plurality of devices 204a-n. Each device can be at least one of or a combination of: a network interface of a computer, laptop, server, tablet, or smart phone. Each device can also be at least one of or a combination of: a hard drive or processor/coprocessor of a computer, laptop, server, tablet, or smart phone. Each stream ID can represent a process such as at least one or a combination of: a web browser, email application, smart phone app, and tablet app. The SMMU 200 converts the virtual addresses 206 and stream IDs 208 to a physical address 210 and a priority 212 based on registers of the SMMU 202 and a transition lookaside buffer (TLB) 214, which is a cache of recently performed virtual-to-physical address conversions. If the TLB 214 does not store the requested virtual-to-physical address conversion, the SMMU 202 includes page walkers 218 which perform the conversion and then store it in the TLB 214 for later use. The page walkers can use a mapping (e.g., the mapping 300 of FIG. 3) to perform the conversion.

Figure 3:
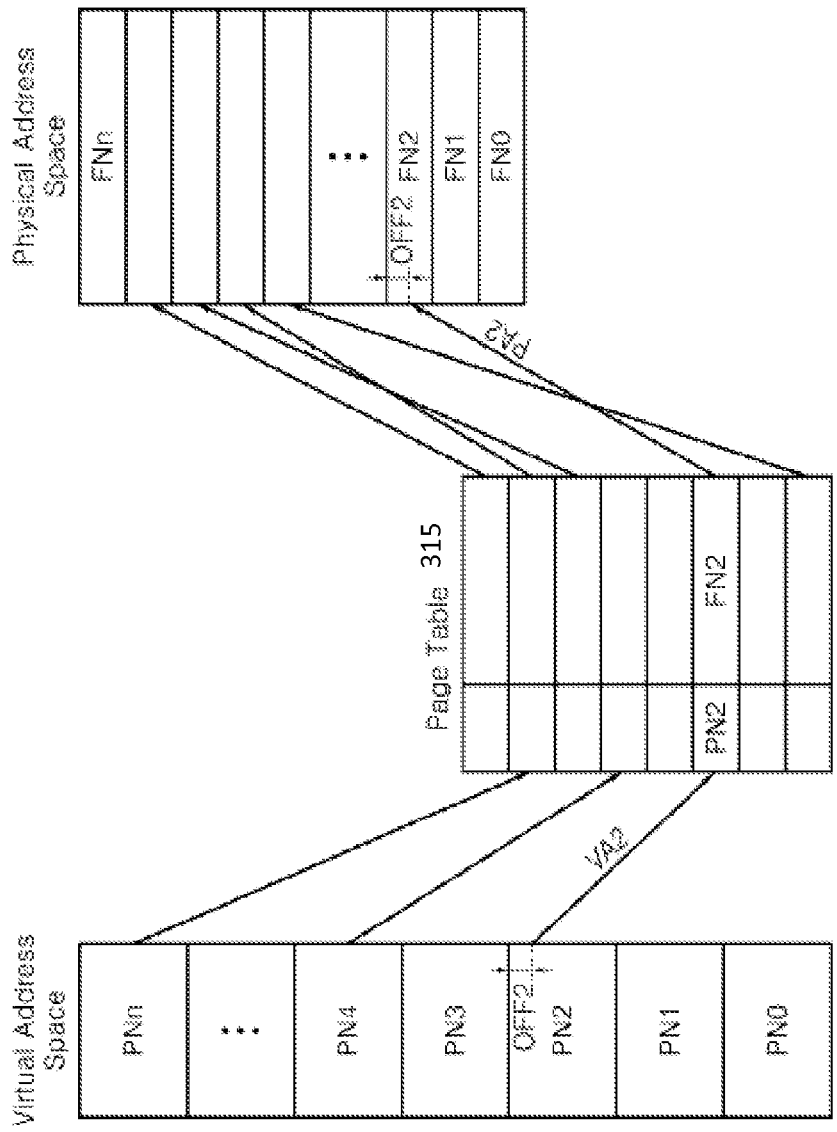
FIG. 3 is a diagram representative of a mapping between virtual addresses and physical addresses according to an example embodiment of the present disclosure.

FIG. 3 is a diagram showing mapping 300 between virtual addresses and physical addresses. Each of the pages PN0 through PNn is a block of adjacent virtual addresses. Each of the pages PN0 through PNn has a given data size of, for example, 4 KB. However, the size of the pages PN0 through PNn is not limited and may be changed. Like the virtual address space, a physical address space may be divided into a plurality of frames FN0 through FNn. Each of the frames FN0 through FNn has a fixed size.

A virtual address, e.g., VA2, includes a page number, e.g., PN2, and an offset, e.g., OFF2, within a page. In other words, the virtual address may be expressed in accordance with:

$$VA_i = PN_j + OFF_x \qquad \text{EQN. 1}$$

where "i", "j" and "x" are 1 or a natural number greater than 1, $VA_i$ is a virtual address, $PN_j$ is a page number, and $OFF_x$ is an offset.

The page number PN2 is used as an index in a page table 315. The offset OFF2 is combined with a frame number, e.g., FN2, defining a physical address, e.g., PA2. The physical address may be expressed in accordance with:

$$PA_r = FN_s + OFF_x \qquad \text{EQN. 2}$$

where "r", "s" and "x" 1 or a natural number greater than 1, PAr is a physical address, FNs is a frame number, and OFFx is an offset. The page number PA2 may be referred to as a virtual page number and the frame number FN2 may be referred to as a physical page number.

The page table 315 contains a mapping between a virtual address of a page and a physical address of a frame. The page table 315 may be included in a separate memory (not shown) or in a cache (not shown) coupled to a MMU (e.g., the SMMU 202 of FIG. 2).

Referring back to FIG. 2, the SMMU 200 compares the stream identifier to all of the entries of stream matchers to determine a context number, or determine that no context matches. The SMMU 200 looks up the context/virtual address and address in the TLB 214, which is a cache memory storing context to physical address translations.

If a transaction hits, the TLB 214 outputs the translated physical address. If the transaction misses, the physical address is translated from the context, for example, by page walkers 218. The page walkers 218 of the SMMU 202 walk the page table to find the virtual-to-physical address conversion. If appropriate, the translation and state are saved back to the TLB 214 the page walkers 218. The SMMU 200 returns the translation to read/write to system memory 216, either directly or through a cache.

A context stores information specific to a particular process or a device/process combination. The context may describe, for example, how to perform memory translation in a virtual memory system. Context information may be stored in a memory, in registers, on devices or in any other location. For example, context information can be stored in memory registers of the SMMU 200.

Figure 4:
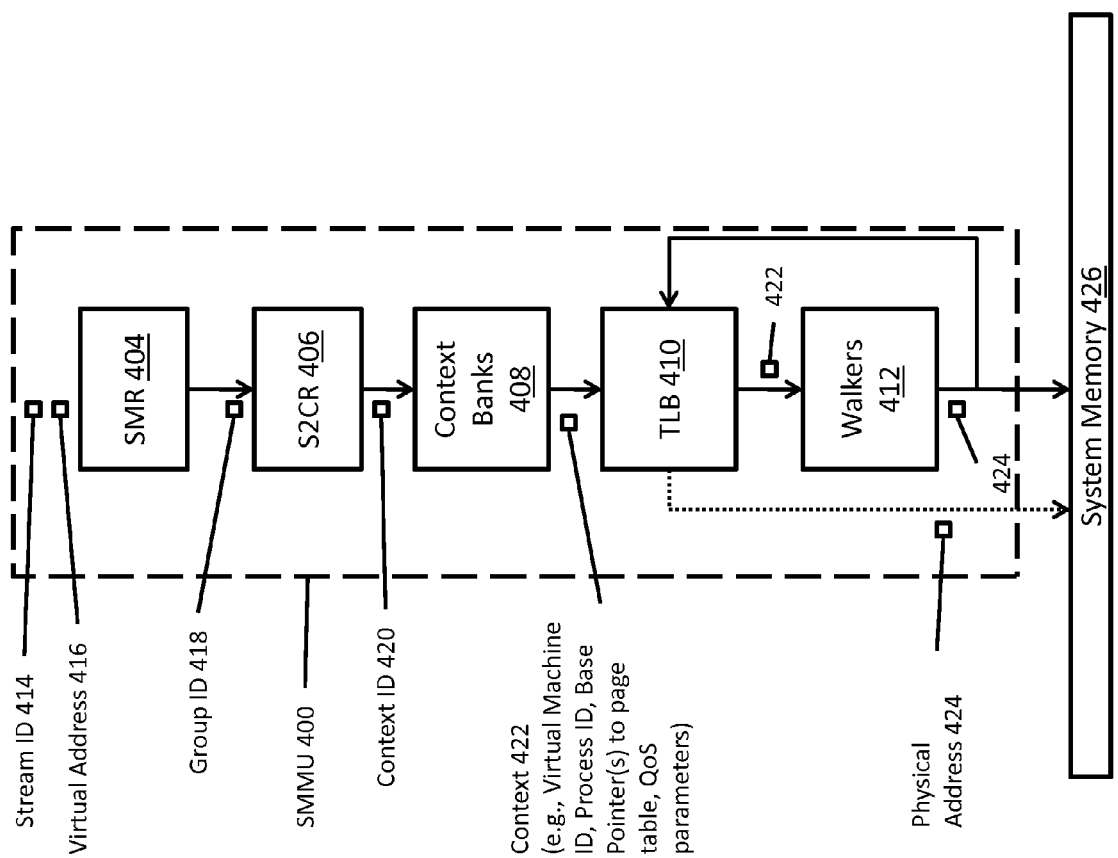
FIG. 4 is a block diagram illustrating a SMMU pipeline according to an embodiment of the present disclosure.

FIG. 4 is a block diagram 400 illustrating an example embodiment of a SMMU pipeline 400. The SMMU pipeline 400 receives a Stream ID 414 and a virtual address 416 to be translated. A Stream Match Register Table (SMR) module 404 is a look-up table (LUT) configured to convert the Stream ID 414 to a Group ID 418. A Stream to Context Register (S2CR) module 406 is a LUT configured to convert the Group ID 418 to a context ID or context bank index 420. The context banks 408 produce a context 422 using the context bank index 420.

The context stores data to perform a full address translation, such as a Virtual Machine ID (VMID), Address Space ID (ASID), Process ID, and base pointer(s) to a page table). Optionally, the context can include other information such as Quality of Service (QoS) information or parameters. From here, a translation lookaside buffer (TLB) 410, which is a cache of context-to-physical address translations, performs a lookup to see if the context 422 has been recently translated and if the recent translation is stored in the TLB 410. If so, the TLB 410 loads the physical address 424 and forwards it to a system memory 426 as an output of the SMMU pipeline 400.

If the translation cannot be found in the TLB 410, a request to find a physical address associated with the context 422a is sent to a page table walker 412, which performs a full page table walk. The walkers 412 may include its own internal cache separate from the TLB 410, which can be used for a lookup before doing a full page table walk. After retrieving the physical address associated with the context 422, the walkers 412 output the physical address 424 to the system memory 426, and in parallel, output the physical address 424 to the TLB 410 to be stored for future lookups.

In some example networking systems, a MMU can reside in a location where each of the VMID and ASID are 16-bit numbers. Thus, a TLB that has an entry formal of {ASID [16:0, VMID{16:0]. CH, CBNDX[6:0], VA[48:12]} is unnecessarily large in a system that can only support 256 contexts. As stated herein, the SMMU context directly identifies a 16-bit VMID or 16-bit ASID which is used to identify the page table entry. A single context has associated with it only one VMID and one ASID. For computing systems that only support 256 contexts, there are only 256 or fewer VMIDs and ASIDs configured by software in the system. There can be fewer than 256 VMIDs/ASIDs, because more than one context can map to the same VMID or ASID. Because of the system only supports 256 contexts, embodiments of the present disclosure map the VMID/ASID 16 bit value to an 8-bit value of 0-255.

As stated herein, embodiments of the present disclosure decrease the size of a TLB on a SMMU by introducing a content addressable memory (CAM) configured to compresses context data (e.g., the VMID and ASID) associated with a virtual address. The CAM compresses the context data based on a location of the CAM the context data is stored. The compressed context data is then stored in the TLB to map the virtual address to a physical address. Accordingly, an example entry format of a TLB includes at least: {ASID[7:0, VMID{7:0]. CH, CBNDX[6:0], VA[48:12]}, where ASID is an address space identifier, VMID is a Virtual Machine Identifier, CH is a channel, and VA is a Virtual Address.

Figure 5A:
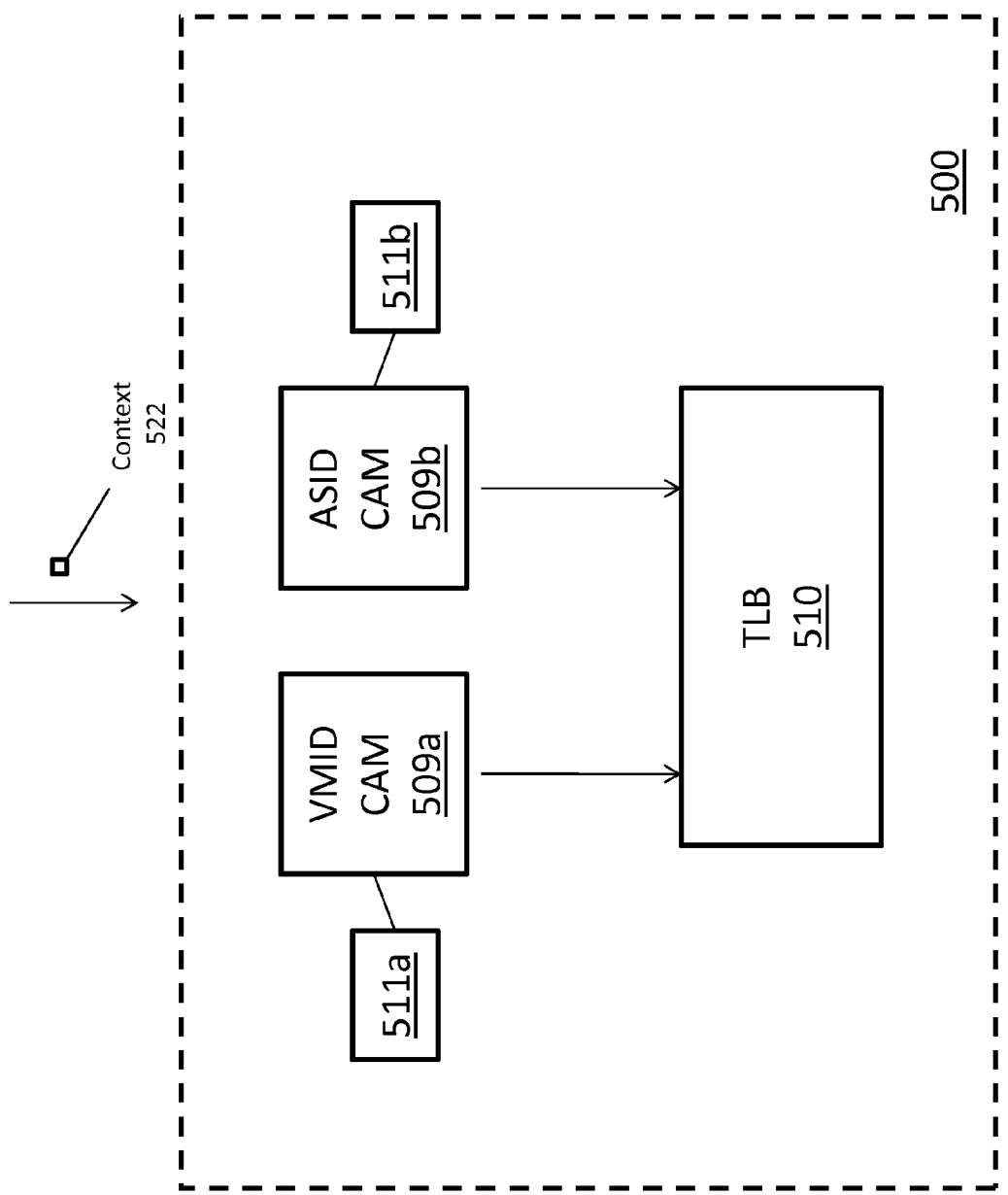
FIG. 5A is a block diagram of a portion of an SMMU pipe line according to an example embodiment of the present disclosure.

FIG. 5A is a block diagram of a portion of an SMMU 500 (e.g., SMMU pipeline 400 of FIG. 4) that also includes a VMID CAM 509a, VMID allocation count register 511b, ASID CAM 509b, ASID allocation count register 511b, and TLB 510. The SMMU 500 receives a context 522 that includes at least a VMID and ASID. The VMID is parsed from the context 522 and compressed in VMID CAM 509a. In addition, ASID is parsed from the context 522 and compressed in ASID CAM 509b.

The VMID and ASID, prior to compression, have a first bit length. In this example embodiment, the bit length is 16 bits. Because the TLB 510, in this example embodiment, only stores 256 contexts, there is no need for the TLB to store all 16 bits of the VMID and 16 bits of the ASID in order to cache context-to-physical address translations. The VMID and ASID are compressed based on a location within their respective CAMs they are stored.

Figure 5B:
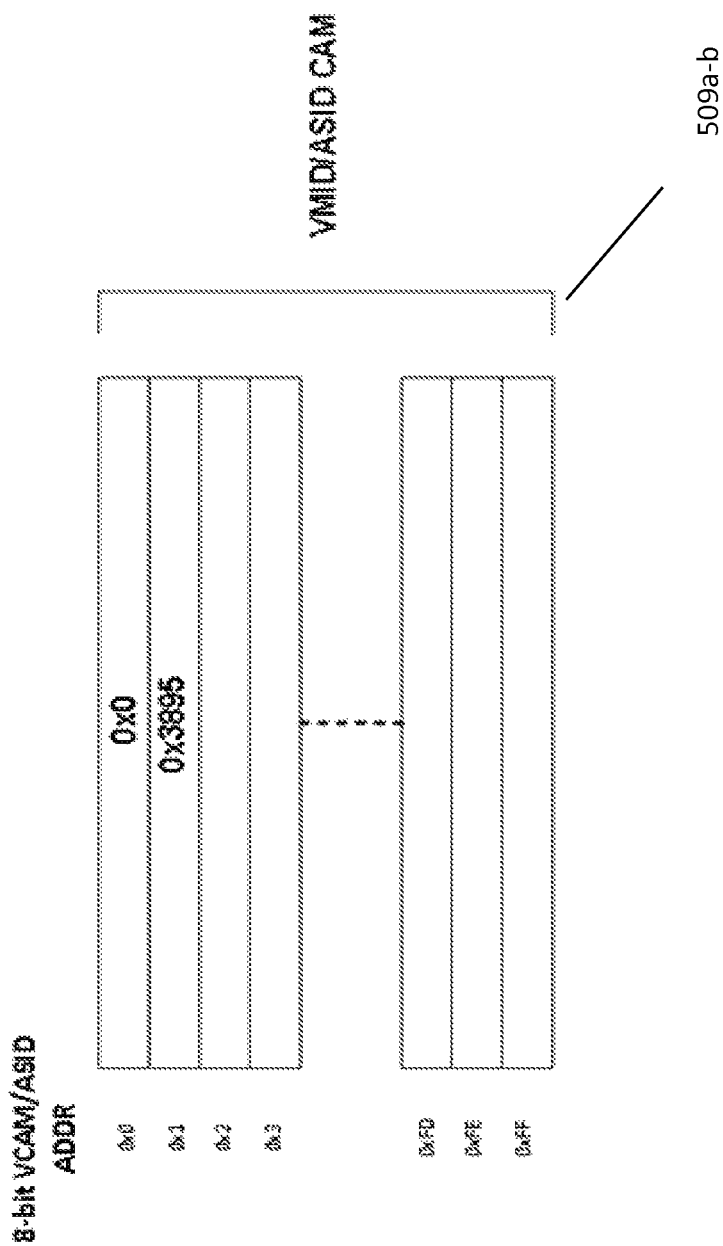
FIG. 5B illustrates a VMID/ASID CAM according to an embodiment of the present disclosure.

FIG. 5B illustrates a VMID/ASID CAM 509a-b that compresses the VMID/ASID based on a location in which a 16 bit VMID/ASID is stored in the VMID/ASID CAM 509a-b.

Referring back to FIG. 5A, the process of compressing the VMID and ASID includes adjusting respective VMID/ASID allocation count registers 511a-b. Since the CAMs used to map the 16-bit value to the 8-bit value is 256 entries deep, any 16-bit value which is no longer used must have its entry invalidated to allow for 256 unique context VMIDs or ASIDs. The allocation count register 511a-b maintains the count of the number of contexts which map to each CAM entry. When that entry is no longer associated with any contexts, the CAM entry is invalidated. In addition, the corresponding TLB entry must be invalidated since the 8-bit VMID or ASID value it contains is no longer associated with any 16-bit value.

Figure 5C:
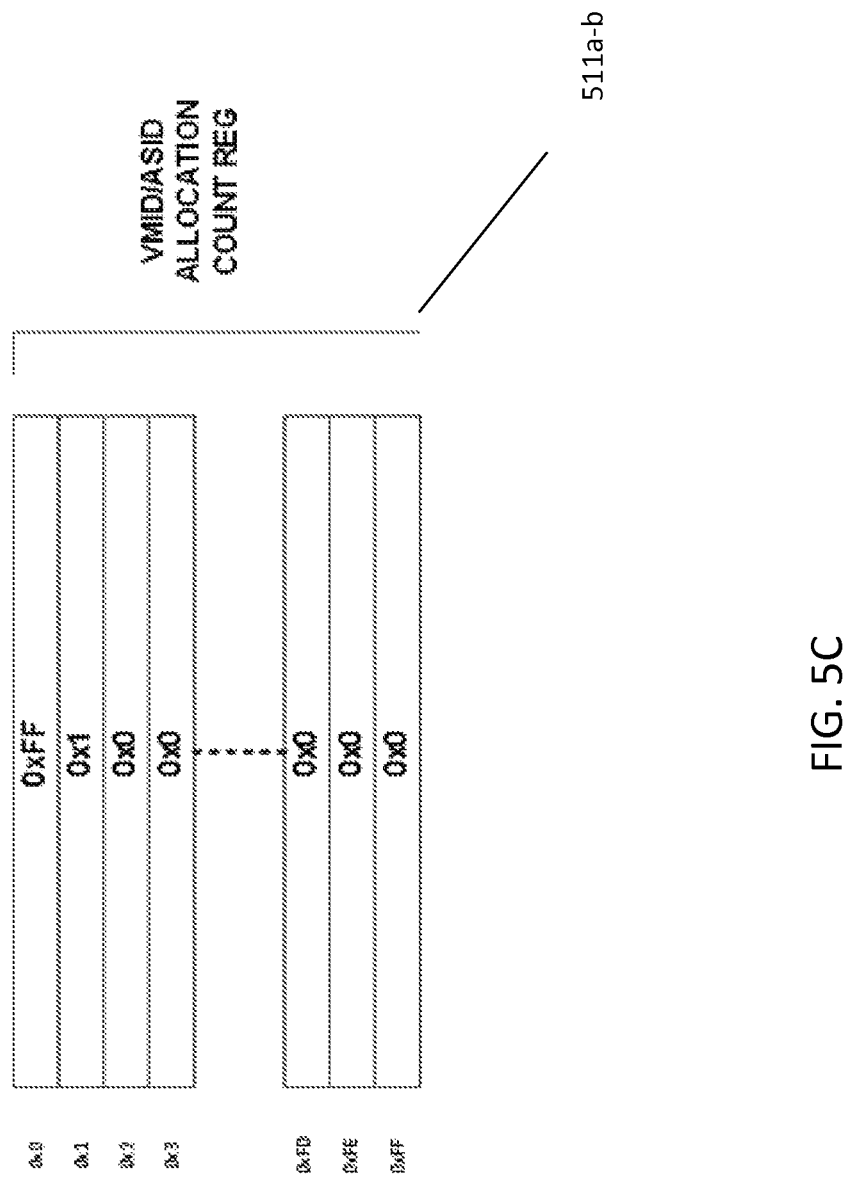
FIG. 5C illustrates a VMID/ASID allocation count register according to an embodiment of the present disclosure.

FIG. 5C illustrates VMID/ASID allocation count register 511a-b. In combination, FIGS. 5B and 5C show a mapping in which 255 contexts all map to the same 16-bit VMID/ASID. A single context maps to a unique value. The CAM in 5B shows that CAM entry 0x0 contains the 16-bit VMID or ASID value of 0x00. (This is typical at reset.) The associated allocation count register in FIG. 5C shows that entry 0x0 contains 0xFF (or 255), which refers to the number of contexts using this VMID/ASID. The CAM in 5B shows that CAM entry 0x1 contains the 16-bit VMID or ASID value of 0x3895. The associated allocation count register in FIG. 5c shows that entry 0x1 contains 0x1, which indicates that one context is using this 16-bit VMID/ASID entry.

In particular, the SMMU adjusts the allocation count registers 511a-b by identifying a replacement VMID/ASID in the VMID/ASID CAM 509a-b and decreasing a first allocation count in the VMID/ASID allocation count register 511a-b corresponding to the replacement VMID/ASID in the VMID/ASID CAM 509a-b. If the VMID/ASID is represented in the VMID/ASID CAM 509a-b, the SMMU 500 increases a second allocation count in the allocation count register 511a-b corresponding to the VMID/ASID stored in the VMID/ASID CAM 509a-b. If the identifier is not represented in the VMID/ASID CAM 509a-b, the SMMU 500 stores the identifier in a free location in the VMID/ASID CAM 509a-b and increases a second allocation count in the allocation count register 511a-b corresponding to the VMID/ASID stored in the free location in the CAM 509a-b.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

The teachings of all patents, published applications and references cited herein are incorporated by reference in their entirety.

While the subject matter of the present disclosure has been particularly shown and described with references to example embodiments thereof, it will be understood by those skilled in the art that various changes in form and details may be made therein without departing from the scope of the subject matter encompassed by the appended claims.

What is claimed is:

1. A method for compressing data for a translation look aside buffer (TLB), the method comprising:
    receiving an identifier at a content addressable memory (CAM), the identifier having a first bit length;
    compressing the identifier based on a location within the CAM the identifier is stored, the compressed identifier having a second bit length, the second bit length being smaller than the first bit length; and
    mapping at least the compressed identifier to a physical address in a buffer.

2. The method of claim 1 wherein the identifier is at least one of: a Virtual Machine Identifier (VMID) and Address Space Identifier (ASID), the VMID and ASID being parsed from a context associated with a virtual address.

3. The method of claim 2 wherein a context is a logical data structure used by the TLB to identify a page table entry, the page table entry mapping a virtual address associated with the identifier to the physical address.

4. The method of claim 1 wherein compressing includes adjusting an allocation count in an allocation count register, the allocation count register being communicatively coupled to the CAM.

5. The method of claim 4 further comprising:
    identifying a replacement identifier in the CAM;
    decreasing a first allocation count in the allocation count register corresponding to the replacement identifier in the CAM;
    if the identifier is represented in the CAM, increasing a second allocation count in the allocation count register corresponding to the identifier stored in the CAM;
    if the identifier is not represented in the CAM, storing the identifier in a free location in the CAM and increasing a second allocation count in the allocation count register corresponding to the identifier stored in free location in the CAM.

6. A system for compressing data for a translation look aside buffer (TLB), the system comprising:
    a content addressable memory (CAM) configured to receive an identifier, the CAM further configured to compress the identifier based on a location within the CAM the identifier is stored, the compressed identifier having a second bit length, the second bit length being smaller than the first bit length; and
    the TLB configured to map at least the compressed identifier to a physical address.

7. The system of claim 6 wherein the identifier is at least one of: a Virtual Machine Identifier (VMID) and Address Space Identifier (ASID), the VMID and ASID being parsed from a context associated with a virtual address.

8. The system of claim 7 wherein a context is a logical data structure used by the TLB to identify a page table entry, the page table entry mapping a virtual address associated with the identifier to the physical address.

9. The system of claim 6 further comprising an allocation count register configured to store an allocation count, the allocation count register being communicatively coupled to the CAM.

10. The system of claim 9 further comprising a memory management unit configured to:
    identify a replacement identifier in the CAM;
    decrease a first allocation count in the allocation count register corresponding to the replacement identifier in the CAM;
    if the identifier is represented in the CAM, increase a second allocation count in the allocation count register corresponding to the identifier stored in the CAM;
    if the identifier is not represented in the CAM, store the identifier in a free location in the CAM and increasing a second allocation count in the allocation count register corresponding to the identifier stored in free location in the CAM.

* * * * *